(12) United States Patent
Chen et al.

(10) Patent No.: US 11,514,685 B2
(45) Date of Patent: Nov. 29, 2022

(54) END-TO-END SIGNALIZED INTERSECTION TRANSITION STATE ESTIMATOR WITH SCENE GRAPHS OVER SEMANTIC KEYPOINTS

(71) Applicant: TOYOTA RESEARCH INSTITUTE, INC., Los Altos, CA (US)

(72) Inventors: Kun-Hsin Chen, Mountain View, CA (US); Peiyan Gong, Ann Arbor, MI (US); Sudeep Pillai, Santa Clara, CA (US); Arjun Bhargava, San Francisco, CA (US); Shunsho Kaku, Mountain View, CA (US); Hai Jin, Ann Arbor, MI (US); Kuan-Hui Lee, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 11 days.

(21) Appl. No.: 17/177,516

(22) Filed: Feb. 17, 2021

(65) Prior Publication Data

US 2022/0261583 A1 Aug. 18, 2022

(51) Int. Cl.
| | |
|---|---|
| *G06V 20/58* | (2022.01) |
| *G06K 9/62* | (2022.01) |
| *G06V 10/44* | (2022.01) |
| *G06V 20/56* | (2022.01) |
| *B60W 50/00* | (2006.01) |

(52) U.S. Cl.
CPC .......... *G06V 20/584* (2022.01); *B60W 50/00* (2013.01); *G06K 9/6215* (2013.01); *G06K 9/6232* (2013.01); *G06K 9/6256* (2013.01); *G06K 9/6269* (2013.01); *G06V 10/443* (2022.01); *G06V 20/588* (2022.01)

(58) Field of Classification Search
CPC .. G06V 20/584; G06V 20/588; G06V 10/443; G06K 9/6215; G06K 9/6232; G06K 9/6256; G06K 9/6269; B60W 50/00
See application file for complete search history.

(56) References Cited

U.S. PATENT DOCUMENTS

| | | | |
|---|---|---|---|
| 9,002,055 | B2 | 4/2015 | Funayama |
| 10,507,807 | B2 | 12/2019 | Ben Shalom |

(Continued)

FOREIGN PATENT DOCUMENTS

EP 2048619 4/2009

*Primary Examiner* — Casey L Kretzer
(74) *Attorney, Agent, or Firm* — Sheppard, Mullin, Richter & Hampton LLP; Hector A. Agdeppa; Daniel N. Yannuzzi

(57) ABSTRACT

Systems, methods, computer-readable media, techniques, and methodologies are disclosed for performing end-to-end, learning-based keypoint detection and association. A scene graph of a signalized intersection is constructed from an input image of the intersection. The scene graph includes detected keypoints and linkages identified between the keypoints. The scene graph can be used along with a vehicle's localization information to identify which keypoint that represents a traffic signal is associated with the vehicle's current travel lane. An appropriate vehicle action may then be determined based on a transition state of the traffic signal keypoint and trajectory information for the vehicle. A control signal indicative of this vehicle action may then be output to cause an autonomous vehicle, for example, to implement the appropriate vehicle action.

20 Claims, 6 Drawing Sheets

(56) References Cited

U.S. PATENT DOCUMENTS

| | | |
|---|---|---|
| 2018/0024562 A1 | 1/2018 | Bellaiche |
| 2020/0098135 A1 | 3/2020 | Ganjineh |
| 2020/0108806 A1 | 4/2020 | Ben Shalom |
| 2020/0184233 A1 | 6/2020 | Berberian |
| 2021/0150350 A1* | 5/2021 | Gao .................. G06N 3/084 |

* cited by examiner

END-TO-END SIGNALIZED INTERSECTION TRANSITION STATE ESTIMATOR WITH SCENE GRAPHS OVER SEMANTIC KEYPOINTS

TECHNICAL FIELD

The disclosed technology relates generally to keypoint detection and association, and in some implementations, relates more particularly to traffic signal transition state estimation using a scene graph of a signalized intersection that identifies semantic keypoints and associations there between.

DESCRIPTION OF RELATED ART

Signalized intersections—traffic intersections that are controlled via the operation of traffic signals—present a key challenge for autonomous vehicle systems. In particular, in order to determine appropriate vehicle control commands for safely navigating an autonomous vehicle through a signalized intersection, vehicle system(s) need to be able to recognize both the particular traffic signal that is associated with a current lane of travel of the autonomous vehicle as well as the current state of the associated traffic signal. However, existing systems for determining traffic signal and lane associations suffer from a number of technical drawbacks including being resource intensive and prohibitively costly to scale.

BRIEF SUMMARY OF THE DISCLOSURE

According to various embodiments of the disclosed technology, a system is disclosed that includes at least one memory storing machine-executable instructions and at least one processor configured to access the at least one memory and execute the machine-executable instructions to perform a set of operations. The set of operations includes determining, using a machine learning model, an output based on an image, the output including a collection of keypoints in the image, a collection of linkages in the image, and a feature map associated with the image, and determining a collection of keypoint embeddings and a collection of linkage embeddings based on the output. The set of operations further includes generating a scene graph of the image based on associations between the collection of keypoints and the collection of linkages, the associations being determined based on the collection of keypoint embeddings and the collection of linkage embeddings, and outputting a vehicle control signal based on the scene graph and localization information for the vehicle.

In an example embodiment, the scene graph corresponds to a signalized intersection, the collection of keypoints includes a first keypoint, and the set of operations further includes determining a current travel lane of the vehicle based on the localization information, and determining, based on the scene graph, that the first keypoint is associated with the current travel lane, where the first keypoint corresponds to a traffic signal in the signalized intersection, and the traffic signal has an associated transition state.

In an example embodiment, the collection of keypoints further includes a second keypoint and a third keypoint and the collection of linkages includes a first linkage and a second linkage, and determining that the first keypoint is associated with the current travel lane includes determining, based on the scene graph, that the second keypoint corresponds to a first lane boundary of the current travel lane; determining, based on the scene graph, that the third keypoint corresponds to a second lane boundary of the current travel lane; and determining, based on the scene graph, that the first keypoint is associated with the second keypoint via the first linkage and that the first keypoint is associated with the third keypoint via the second linkage.

In an example embodiment, the vehicle control signal is indicative of a predetermined vehicle action associated with the transition state of the traffic signal.

In an example embodiment, each keypoint is a respective pixel location in the image that is associated with a corresponding candidate object.

In an example embodiment, determining the collection of keypoint embeddings includes determining, for each keypoint, a respective feature vector in the feature map that corresponds to the keypoint.

In an example embodiment, the set of operations further includes determining a respective classification for the corresponding candidate object associated with each keypoint, and associating, for each keypoint, the respective classification corresponding to the keypoint with the respective feature vector corresponding to the keypoint.

In an example embodiment, each linkage is represented as a respective pixel location in the image along a line connecting a respective source candidate object and a respective destination candidate object.

In an example embodiment, determining the collection of linkage embeddings includes determining, for each linkage, a respective source object embedding for the respective source candidate object and a respective destination object embedding for the respective destination candidate object.

In an example embodiment, the set of operations further includes determining a respective relationship type between the respective source object embedding and the respective destination object embedding for each linkage.

In an example embodiment, for a particular linkage, the respective source object embedding is a first feature vector in the feature map and the respective destination object embedding is a second feature vector in the feature map.

In an example embodiment, determining the associations between the collection of keypoints and the collection of linkages includes determining, for a particular linkage, a first keypoint embedding that is a closest match to the respective source object embedding of the particular linkage, and determining a second keypoint embedding that is a closest match to the respective destination object embedding of the particular linkage.

In an example embodiment, determining the associations between the collection of detected keypoints and the collection of detected linkages includes selecting, among candidate sets of associations, a particular set of associations that minimizes an aggregate loss for the scene graph.

According to various embodiments of the disclosed technology, a method is disclosed that includes determining, using a machine learning algorithm and based on detected keypoints, detected linkages, and a feature map associated an image, keypoint embeddings and linkage embeddings; determining associations between the detected keypoints and the detected linkages based on the keypoint embeddings and the linkage embeddings; determining an association between a particular keypoint of the detected keypoints and a current travel lane of a vehicle based on the determined associations between the keypoint embeddings and the linkage embeddings; and controlling operation of the vehicle in response to a control signal generated based on the determined association between the particular keypoint and the current travel lane of the vehicle.

In an example embodiment, the image is an image of a signalized intersection, and the method further includes generating a scene graph of the signalized intersection, the scene graph identifying the determined associations between the detected keypoints and the detected linkages corresponds to a signalized intersection; determining the current travel lane of the vehicle based on localization information associated with the vehicle; and using the scene graph to determine the association between the particular keypoint and the current travel lane, the particular keypoint representing a traffic signal in the signalized intersection that has an associated transition state.

In an example embodiment, the particular keypoint is a first keypoint, the detected keypoints further include a second keypoint and a third keypoint, and the detected linkages include a first linkage and a second linkage. Further, in an example embodiment, determining the association between the first keypoint and the current travel lane includes determining, based on the scene graph, that the second keypoint corresponds to a first lane boundary of the current travel lane; determining, based on the scene graph, that the third keypoint corresponds to a second lane boundary of the current travel lane; and determining, based on the scene graph, that the first keypoint is associated with the second keypoint via the first linkage and that the first keypoint is associated with the third keypoint via the second linkage.

In an example embodiment, controlling operation of the vehicle includes controlling operation of the vehicle based on a vehicle control signal that is indicative of a predetermined vehicle action associated with the transition state of the traffic signal.

In an example embodiment, each keypoint is a respective pixel location in the image that is associated with a corresponding candidate object, and each linkage is represented as a respective pixel location in the image along a line connecting a respective source candidate object and a respective destination candidate object.

In an example embodiment, determining the linkage embeddings includes determining, for each linkage, a respective source object embedding and a respective destination object embedding.

In an example embodiment, determining the associations between the detected keypoints and the detected linkages includes determining, for a particular linkage, a first keypoint embedding that is a closest match to the respective source object embedding of the particular linkage; and determining a second keypoint embedding that is a closest match to the respective destination object embedding of the particular linkage.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
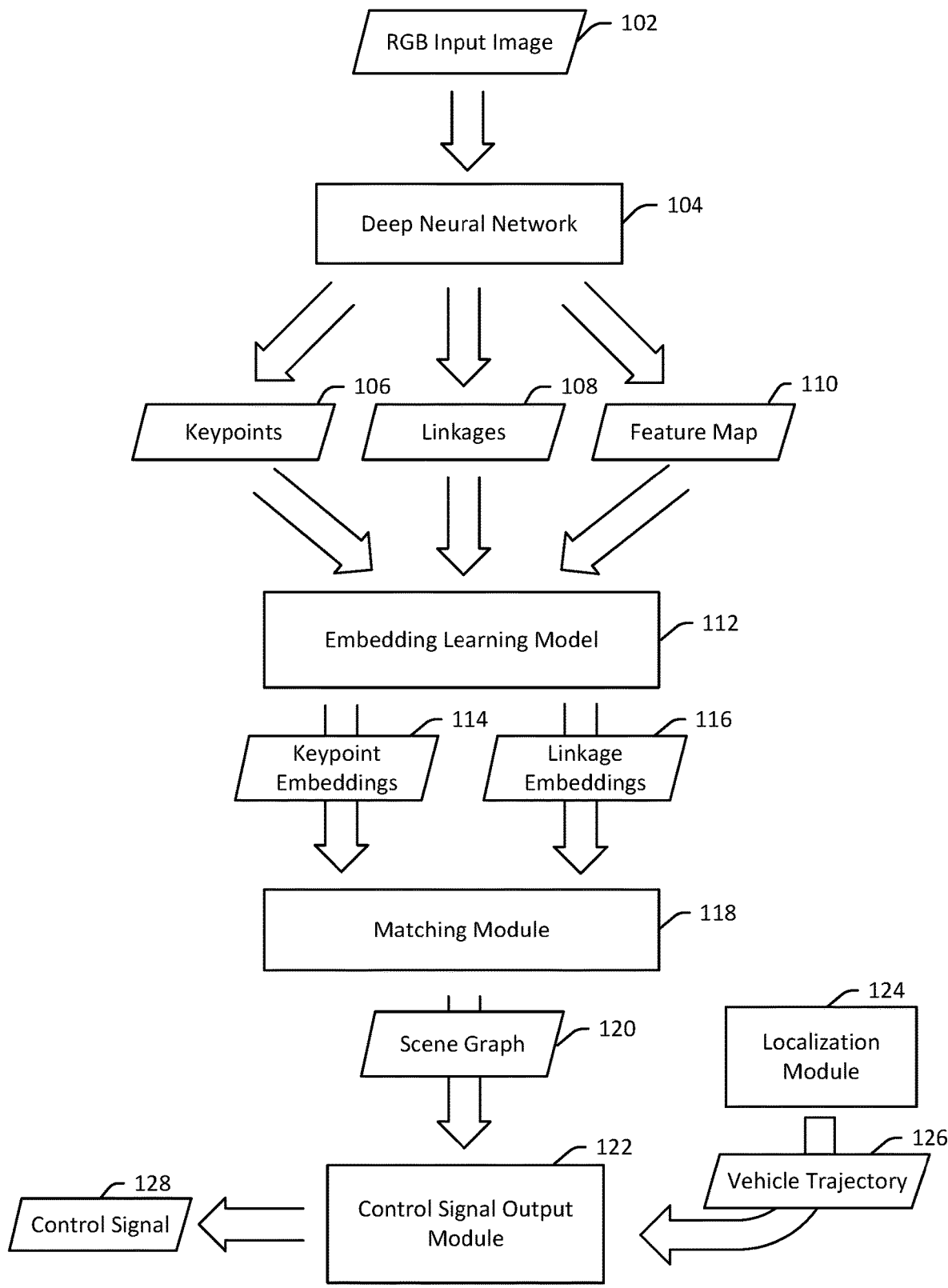
FIG. 1 is a schematic representation of end-to-end, learning-based semantic keypoint detection and association in accordance with example embodiments.

The figures are not exhaustive and do not limit the present disclosure to the precise form disclosed.

DETAILED DESCRIPTION

Example embodiments disclosed herein relate to, among other things, systems, methods, computer-readable media, techniques, and methodologies for performing end-to-end, learning-based keypoint detection and association. In particular, in example embodiments, a scene graph of a signalized intersection is constructed from an input image of the intersection. The scene graph includes detected keypoints and linkages identified between the keypoints. Each keypoint may be a pixel location or a group of pixel locations in the image that correspond to an object detected in the image. In the case of a signalized intersection, for example, keypoints may be representative of traffic signals/lights; stop lines (e.g., road surface demarcations that identify an expected stopping location for a vehicle when a traffic signal is displaying a red light); lane boundaries (e.g., road surface demarcations that identify vehicle travel lanes and distinguish one travel lane from another); other types of road surface markings such as left or right-turn indicators on a road surface; and so forth.

In example embodiments, keypoints may also have classifications associated therewith. For instance, a traffic signal currently in a "green light" transition state would correspond to a different keypoint than a traffic signal currently in a "yellow light" or a "red light" transition state. It should be appreciated that the terms "transition state" and "state" may be used interchangeably herein. The term "transition state" may at times be used merely to reinforce the notion that a current state of an object (e.g., a traffic signal) may be ephemeral, and that the object may transition between different states that correspond to keypoints with different classifications. It should further be appreciated that the above examples of keypoints are merely illustrative and not exhaustive.

The scene graph may additionally identify linkages between various keypoints. Each such linkage may define a relationship between a first keypoint representing a source object detected in the input image and a second keypoint representing a destination object detected in the input image. In example embodiments, a given keypoint may represent a source object for multiple different linkages. Similarly, a given keypoint may represent a destination object for multiple different linkages. Moreover, each linkage may have a corresponding relationship type associated therewith. The relationship type may define the nature of the relationship between the source object and the destination object connected via the linkage. For instance, keypoints representing traffic signals at different locations of an intersection along a direction of travel may be associated via a "synchronization" linkage that indicates that the traffic signals are synchronized with one another. As another non-limiting example, two keypoints may be associated via a "control" linkage. For instance, a source keypoint representing a traffic signal may control vehicle behavior with respect to a destination keypoint representing a portion of a stop line associated with a vehicle travel lane to which the traffic signal corresponds. It should be appreciated that the above examples of linkages and relationship types are merely illustrative and not exhaustive.

In example embodiments, once generated, a scene graph may be used in conjunction with vehicle localization information to determine: 1) a current lane of travel for a vehicle, 2) which traffic signal corresponds to the current lane of travel, and 3) the current transition state of that traffic signal. This information can then be used to generate a vehicle control command which is indicative of an appropriate vehicle action to be taken based on a planned trajectory (e.g., a planned navigation route) for a vehicle, such as an autonomous vehicle.

The techniques disclosed herein for performing keypoint detection and association in connection with, for example, signalized intersection transition state estimation provide technical solutions to a variety of technical problems associated with existing techniques. In particular, most existing traffic light recognition systems employed by autonomous vehicles rely on high-definition (HD) maps to perform the matching that establishes the associations between traffic lights and corresponding lanes of travel and the associations between travel lanes and surface markings/lane boundaries. Such HD maps, however, require manual annotation of the various objects detected at a signalized intersection. This is a resource-intensive task, which can become prohibitively expensive as the coverage area of an HD map is scaled up—that is, as the number of signalized intersections annotated within an HD map increases. Moreover, as HD maps become increasingly more complex with more annotations, processing the data contained in such maps in connection with real-time or near real-time traffic light recognition can become computationally intensive.

Example embodiments provide technical solutions to the above-described technical problems associated with existing traffic light recognition systems. These technical solutions are provided in the form of end-to-end, learning-based signalized intersection transition state estimation that involves training and employing machine learning models to perform keypoint detection and association on an input image of a signalized intersection and output a scene graph that identifies the detected keypoints and corresponding linkages between them. The scene graph can then be used to determine a traffic signal associated with a current vehicle travel lane and its corresponding transition state such that an appropriate vehicle action can be taken to safely navigate an autonomous vehicle through the signalized intersection in accordance with a planned trajectory.

Thus, embodiments solve the technical problem of determining associations between keypoints (e.g., determining which traffic signal corresponds to which lane of travel) while, at the same time, avoiding both the labor-intensive task of manually annotating HD maps and the computationally-intensive task of processing such maps in connection with traffic light recognition. In addition, embodiments allow for signalized intersection transition state estimation to be easily scaled up because machine learning models trained on a sufficient amount of ground-truth data can be applied to a wide range of signalized intersections. Moreover, techniques described herein not only solve the association problem described above, but also improve the semantic keypoint detection itself because there is often an underlying correlation between keypoints (e.g., there is generally a stop line, or more precisely, an intersection of a stop line and a lane center line underneath or otherwise in proximity to a traffic signal).

Various technical features and aspects of embodiments of disclosed technology that yield the above-described technical solutions and their resulting technical benefits will now be described in more detail in reference to the Figures and the illustrative embodiments depicted therein.

Figure 2:
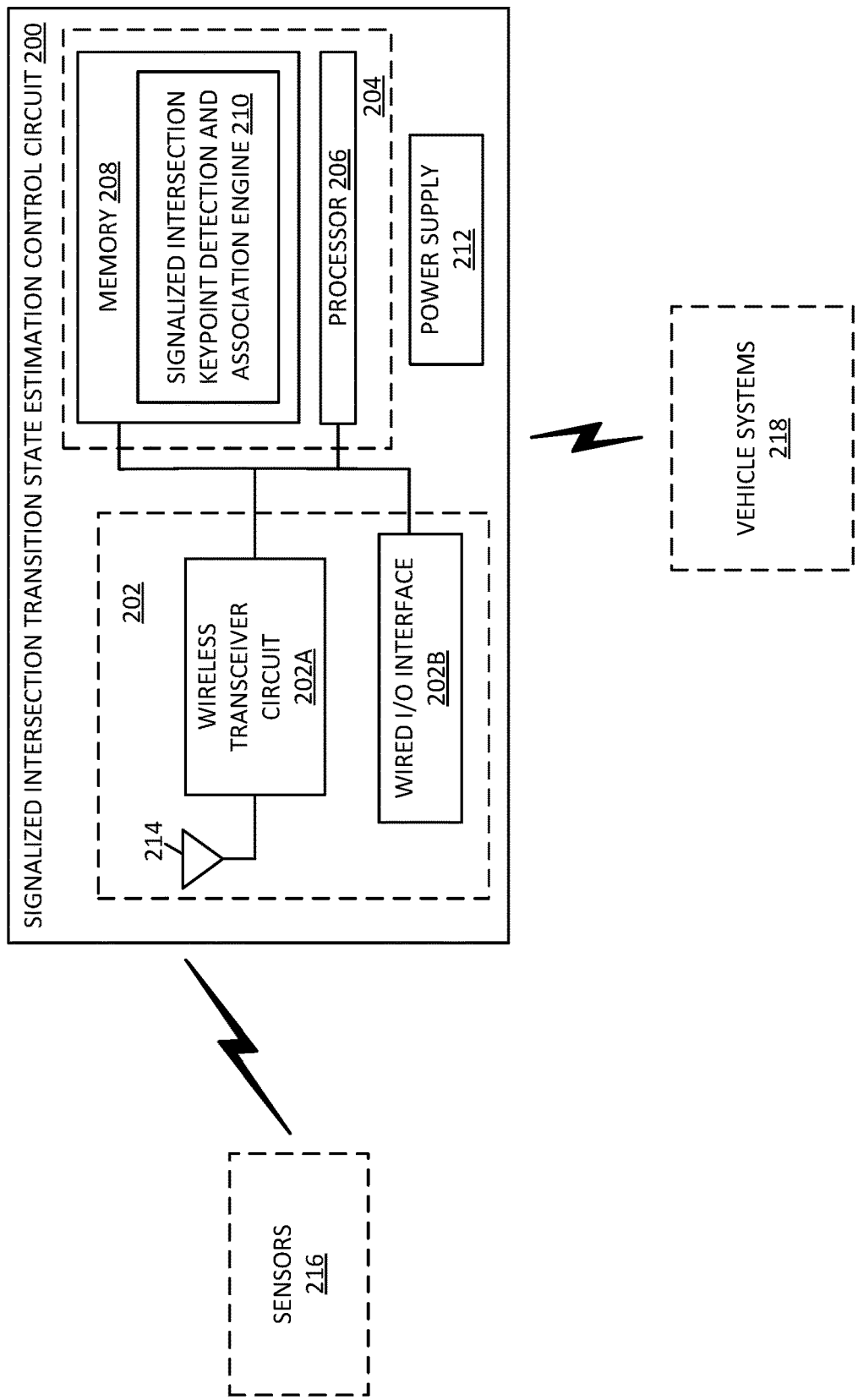
FIG. 2 illustrates an example circuit architecture for implementing signalized intersection transition state estimation using semantic keypoint detection and association in accordance with example embodiments.
Figure 3:
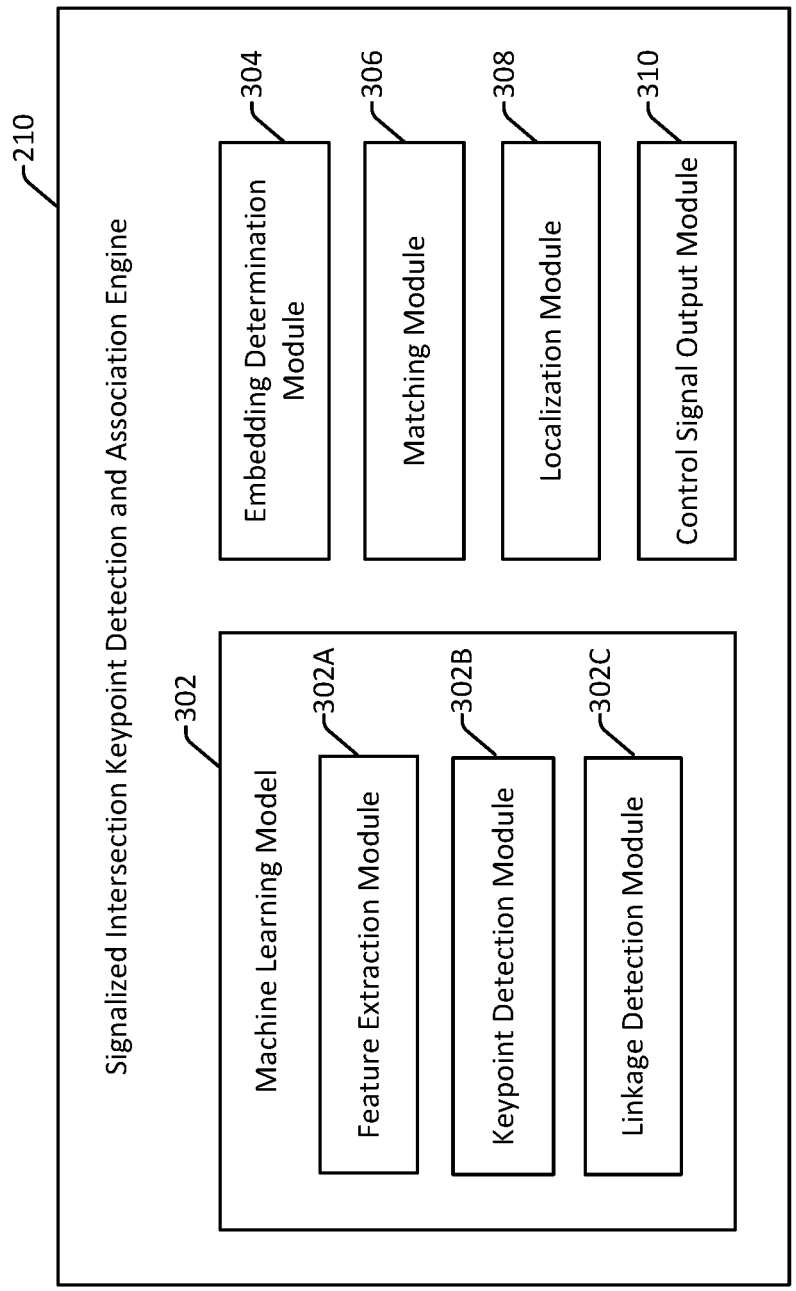
FIG. 3 illustrates example computing modules configured to perform various processing associated with signalized intersection transition state estimation using semantic keypoint detection and association in accordance with example embodiments.
Figure 5:
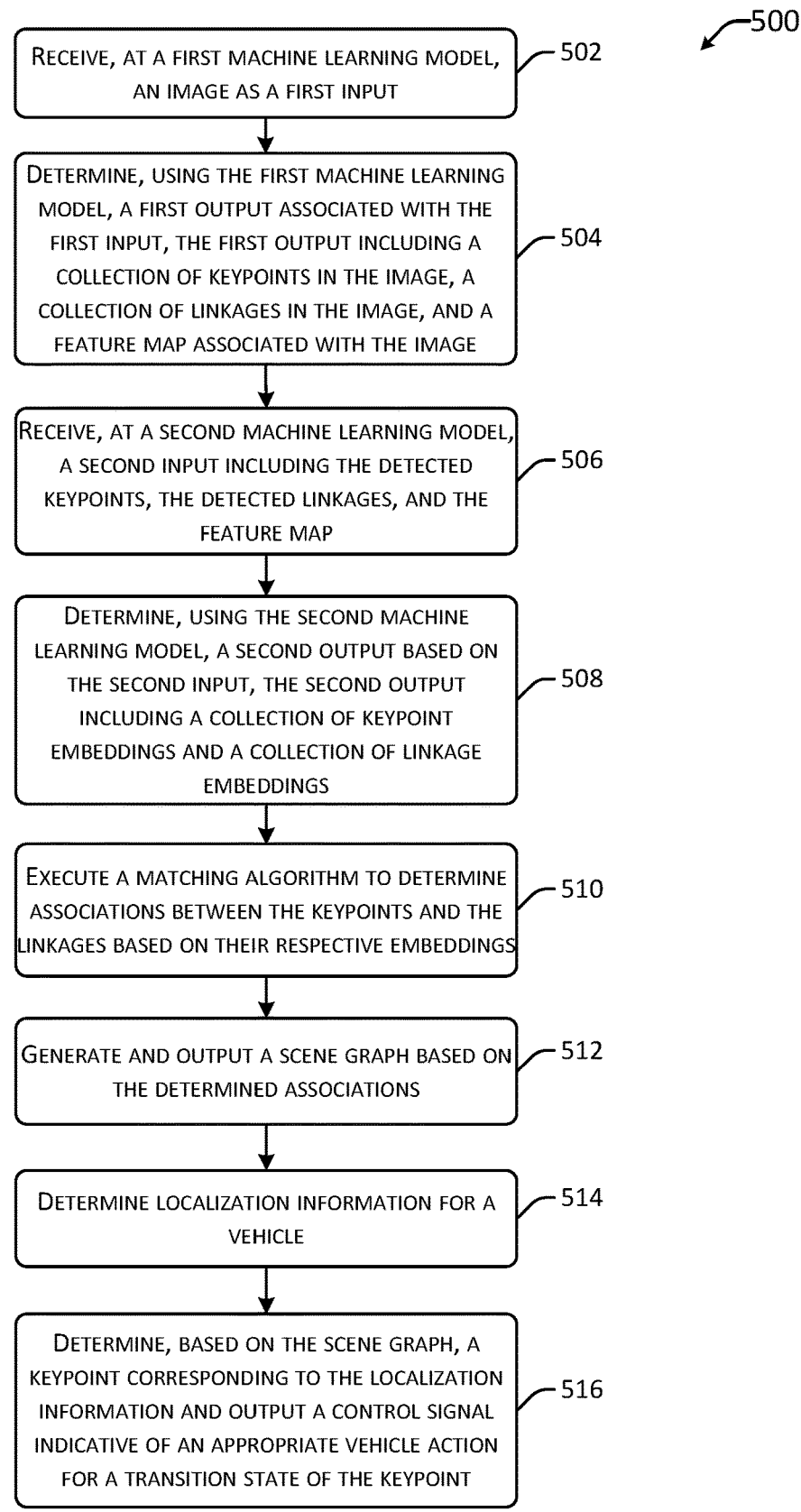
FIG. 5 is a flowchart of an illustrative method for signalized intersection transition state estimation using semantic keypoint detection and association in accordance with example embodiments.

FIG. 1 is a schematic representation of end-to-end, learning-based semantic keypoint detection and association in accordance with example embodiments. FIG. 2 illustrates an example circuit architecture for implementing signalized intersection transition state estimation using semantic keypoint detection and association in accordance with example embodiments. FIG. 3 illustrates example computing modules for performing various processing associated with signalized intersection transition state estimation using keypoint detection and association in accordance with example embodiments. FIG. 5 is a flowchart of an illustrative method 500 for signalized intersection transition state estimation using keypoint detection and association in accordance with example embodiments. FIGS. 1, 2, 3, and 5 will be described at various times hereinafter in conjunction with one another.

Referring first to FIG. 2, an example implementation of a signalized intersection transition state estimation control circuit 200 is depicted. The control circuit 200 may, for example, be configured to execute machine-executable instructions contained in a signalized intersection keypoint detection and association engine 210 to perform end-to-end, learning-based keypoint detection and association with respect to a signalized intersection. The control circuit 200 may be provided in a vehicle, such as an autonomous vehicle. For instance, control circuit 200 can be implemented as part of an electronic control unit (ECU) of a vehicle or as a standalone component. The example control circuit 200 may be implemented in connection with any of a number of different vehicles and vehicle types including, without limitation, automobiles, trucks, motorcycles, recreational vehicles, or other on- or off-road vehicles. In addition, example embodiments may be implemented in connection with hybrid electric vehicles, gasoline-powered vehicles, diesel-powered vehicles, fuel-cell vehicles, electric vehicles, or the like.

In the example implementation depicted in FIG. 2, the control circuit 200 includes a communication circuit 202, a decision circuit 204 (including a processor 206 and a memory 208 in this example) and a power supply 212. While components of the control circuit 200 are illustrated as communicating with each other via a data bus, other communication interfaces are also contemplated. Although not depicted in FIG. 2, the control circuit 200 may include a switch (physical or virtual) that allows a user to toggle the functionality of the control circuit 200 disclosed herein on and off.

Processor 206 can include a graphical processing unit (GPU), a central processing unit (CPU), a microprocessor, or any other suitable processing unit or system. The memory 208 may include one or more various forms of memory or data storage (e.g., flash memory, random access memory (RAM), etc.). Memory 208, can be made up of one or more modules of one or more different types of memory, and may be configured to store data and other information as well as operational instructions that may be used by the processor 206 to implement functionality of the control circuit 200. For example, the memory 208 may store a signalized intersection keypoint detection and association engine 210, which may include computer-executable/machine-executable instructions that, responsive to execution by the processor 206, cause various processing to be performed in connection with keypoint detection and association for an input image of a signalized intersection. The executable instructions of the engine 210 may be modularized into various computing modules, each of which may be configured to perform a specialized set of tasks associated with keypoint detection and association for a signalized intersection.

Although the example of FIG. 2 is illustrated using processor and memory circuitry, as described below with reference to circuits disclosed herein, decision circuit 204 can be implemented utilizing any form of circuitry including, for example, hardware, software, firmware, or any combination thereof. By way of further example, one or more processors; controllers; application specific integrated circuits (ASICs); programmable logic array (PLAs) devices; programmable array logic (PAL) devices; complex programmable logic devices (CPLDs); field programmable gate arrays (FPGAs); logical components; software routines; or other mechanisms might be implemented to make up the control circuit 200. Similarly, in some example embodiments, the engine 210 can be implemented in any combination of software, hardware, or firmware.

Communication circuit 202 may include a wireless transceiver circuit 202A with an associated antenna 212 and/or a wired input/output (I/O) interface 202B with an associated hardwired data port (not illustrated). As this example illustrates, communications with the control circuit 200 can include wired and/or wireless communications. Wireless transceiver circuit 202A can include a transmitter and a receiver (not shown) to allow wireless communications via any of a number of communication protocols such as, for example, an 802.11 wireless communication protocol (e.g., WiFi), Bluetooth, near field communications (NFC), Zigbee, or any of a number of other wireless communication protocols whether standardized, proprietary, open, point-to-point, networked or otherwise. Antenna 212 is coupled to wireless transceiver circuit 202A and is used by wireless transceiver circuit 202A to transmit radio frequency (RF) signals wirelessly to wireless equipment with which it is connected and to receive radio signals as well. These RF signals can include information of almost any sort that is sent or received by the control circuit 200 to/from other entities such as vehicle sensors 216, other vehicle systems 218, or the like.

A vehicle, such as an autonomous vehicle, can include a plurality of sensors 216 that can be used to detect various conditions internal or external to the vehicle and provide sensed conditions to, for example, the control circuit 200. In example embodiments, the sensors 216 may be configured to detect one or more conditions directly or indirectly such as, for example, fuel efficiency, motor efficiency, hybrid efficiency, acceleration, etc. In some embodiments, one or more of the sensors 216 may include their own processing capability to compute the results for additional information that can be provided to, for example, an ECU and/or the control circuit 200. In other example embodiments, one or more sensors may be data-gathering-only sensors that provide only raw data. In further example embodiments, hybrid sensors may be included that provide a combination of raw data and processed data. The sensors 216 may provide an analog output or a digital output.

One or more of the sensors 216 may be able to detect conditions that are external to the vehicle as well. Sensors that might be used to detect external conditions can include, for example, sonar, radar, lidar or other vehicle proximity sensors, and cameras or other image sensors. Image sensors can be used to detect, for example, objects associated with a signalized intersection. While some sensors can be used to actively detect passive environmental objects, other sensors can be included and used to detect active objects such as those objects used to implement smart roadways that may actively transmit and/or receive data or other information.

Referring again to the control circuit 200, wired I/O interface 202B can include a transmitter and a receiver (not shown) for hardwired communications with other devices. For example, wired I/O interface 202B can provide a hardwired interface to other components, including vehicle sensors or other vehicle systems. Wired I/O interface 202B can communicate with other devices using Ethernet or any of a number of other wired communication protocols whether standardized, proprietary, open, point-to-point, networked or otherwise.

Power supply 212 can include one or more batteries of one or more types including, without limitation, Li-ion, Li-Polymer, NiMH, NiCd, NiZn, $NiH_2$, etc. (whether rechargeable or primary batteries); a power connector (e.g., to connect to vehicle supplied power); an energy harvester (e.g., solar cells, a piezoelectric system, etc.); or any other suitable power supply.

Referring now to FIG. 3, in example embodiments, the signalized intersection keypoint detection and association engine 210 may include one or more computing modules, each of which may be configured to perform a specialized set of tasks as part of implementing functionality of the engine 210. In particular, as depicted in FIG. 3, the engine 210 may include a machine learning model 302, which in turn, may include a feature extraction module 302A, a keypoint detection module 302B, and a linkage detection module 302C. The machine learning model 302 may be, for example, an artificial neural network (ANN) such as a deep neural network (DNN) that may be trained using ground-truth data. The ground-truth data may be image data including multiple image frames corresponding to various signalized intersections in which objects in the images and relationships between the objects are labeled. Alternatively, the machine learning model 302 may employ other types of supervised machine learning algorithms such as regression models, classifiers, or the like. The engine 210 may further include an embedding determination module 304 (which itself may be a trained machine learning model), a matching module 306, a localization module 308, and a control signal output module 310. The respective processing performed by these various modules will be described in more detail hereinafter in reference to FIGS. 1 and 5.

It should be appreciated that the number of modules and the tasks associated with each module depicted in FIG. 3 are merely illustrative and not restrictive. The engine 210 may include more or fewer modules than what is depicted in FIG. 3, and the partitioning of processing between the modules may vary. Further, any module depicted as a sub-module of another module may instead be a standalone module, or vice versa. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Referring now to FIG. 5 in conjunction with FIGS. 1 and 3, at block 502 of the method 500, an image may be received as input at a first machine learning model. In example embodiments, as depicted in FIG. 1, the input image may be a two-dimensional (2D) RGB image 102 and the first machine learning model may be a deep neural network 104, which in turn, may be a particular implementation of the machine learning model 302 depicted in FIG. 3. The input image 102 may be a particular image frame of a series of image frames of a signalized intersection captured over time. The deep neural network 104 may have been previously trained based on ground-truth image data corresponding to one or more signalized intersections. The ground-truth data may be image data in which various objects present in the signalized intersection(s) are labeled (e.g., traffic signals, stop lines, lane markings, lane boundaries, etc.).

At block 504 of the method 500, the first machine learning model may be used to determine a first output associated with the first input. The first output may include a collection of keypoints detected in the image, a collection of linkages between keypoints detected in the image, and a feature map. The feature map may be, for example, a matrix of feature vectors, where each feature vector is a set of feature values for a corresponding set of features that the first machine learning model is trained to learn. For instance, referring to FIGS. 1 and 2, based on the input image 102, the trained deep neural network 104 may execute the feature extraction module 302A to extract a feature map 110 from the input image 102; may execute the keypoint detection module 302B to obtain a collection of keypoints 106 detected within the image 102; and may execute the linkage detection module 302C to obtain a collection of linkages 108 between the keypoints 106.

As previously noted, the keypoints 106 may correspond to detected objects within the image 102 including, in the case of a signalized intersection, for example, traffic lights, stop lines, lane boundaries, pedestrian walkway markings, lane markings, and so forth. Traffic lights captured in the image 102 in different transition states (e.g., a "red light" vs. "a green light") may correspond to keypoints with different classification types, as will described in more detail later in this disclosure. In example embodiments, each keypoint 106 may be a single pixel in the image 102 (e.g., a center pixel of a bounding box or other region that encompasses the corresponding object detected in the image 102) or a collection of pixels (e.g., respective pixels representing corners of a rectangular bounding box). In the case of a stop line, a corresponding keypoint may represent a pixel location in the image 102 at an intersection between the stop line and a center line of a vehicle travel lane.

The linkages 108 may represent connections between candidate source and destination objects. In particular, each linkage 108 may represent a connection between a particular candidate source object in the image 102 (represented by a corresponding source keypoint) and a particular candidate destination object in the image 102 (represented by a corresponding destination keypoint). In some example embodiments, a linkage 108 may be represented by a center pixel of a line connecting the candidate source object and the candidate destination object in the input image 102.

The feature map 110 may be a collection of feature vectors extracted by the feature extraction module 302A from the image 102. In example embodiments, the neural network 104—in particular the feature extraction module 302A of the neural network 104—may have previously been trained, using ground-truth data, to learn a particular collection of image features. Each feature vector included in the feature map 110 may represent a particular combination of feature values learned from the input image 102 for the collection of features that the machine learning model was trained to learn.

At block 506 of the method 500, the detected keypoints, the detected linkages, and the feature map may be received as input at a second machine learning model. The second machine learning model may be, for example, the embedding determination module 304 depicted in FIG. 3. At block 508 of the method 500, the embedding determination module 304 may be employed to determine a collection of keypoint embeddings and a collection of linkage embeddings based on the input received at block 506. In particular, the embedding determination module 304 may be a machine learning model that has been trained to learn embeddings for keypoints and linkages based on a feature map.

A particular implementation of the embedding determination module 304 is depicted in FIG. 1 as an embedding learning model 112. Referring now to the example method 500 with specific reference to the particular implementation depicted in FIG. 1, at block 506 of the method 500, the embedding learning model 112 may receive, as input, the collection of keypoints 106, the collection of linkages 108, and the feature map 110 outputted by the neural network 104. The embedding learning model 112 may be configured to learn keypoint embeddings 114 for each of the candidate objects (keypoints 106) and linkage embeddings 116 for each of the candidate edges (linkages 108) identified in the input image 102. In particular, at block 508 of the method 500, for each keypoint 106, the embedding learning model 112 may output a corresponding keypoint embedding 114 and an associated classification of the candidate object represented by the keypoint. The keypoint embedding 114 may be a feature vector from the feature map 110 that includes feature values that match or otherwise most closely represent the collection of feature values associated with the candidate object represented by the keypoint.

In example embodiments, the keypoint classification may be a type identifier for the candidate object represented by the keypoint. For instance, a traffic signal displaying a green light in the image 102 may have a different classification type from a traffic signal displaying a yellow light in the image 102. Further, stop lines, lane boundaries, lane markings, and so forth may be associated with different classification types. In some example embodiments, all stop lines may correspond to a single classification type, while different types of lane boundaries (e.g., a boundary between adjacent travel lanes vs. a boundary between a shoulder and a travel lane) may correspond to different classification types.

For each linkage 108, the embedding learning model 112 may generate three corresponding outputs. In particular, the embedding learning model 112 may determine a source object embedding, a destination object embedding, and a relationship type indicator for each linkage 108. The linkage embeddings 116 for the various linkages 108 may include both the source object embedding and the destination object embedding for each linkage 108. The source object embedding for a given linkage 108 may be a feature vector from the feature map 110 that includes feature values that match or otherwise most closely represent the collection of feature values associated with the candidate source object for that linkage. Similarly, the destination object embedding for a given linkage 108 may be a feature vector from the feature map 110 that includes feature values that match or otherwise most closely represent the collection of feature values associated with the candidate destination object for that linkage.

The relationship type determined by the embedding learning model 112 for each linkage 108 may define the nature of the relationship between the source object and the destination object connected via that linkage 108. For instance, two keypoints representing respective traffic signals located at different points of an intersection along the direction of travel may be associated via a "synchronization" linkage that indicates that the two traffic signals are synchronized with one another. As another non-limiting example, two keypoints may be associated via a "control" linkage. For instance, a source keypoint representing a traffic signal may control vehicle behavior with respect to a destination keypoint representing a portion of a stop line associated with a vehicle travel lane to which the traffic signal corresponds. As yet another non-limiting example, a linkage 108 may be associated with a "turning lane" relationship type that defines a relationship between a traffic signal associated with a turning lane and a lane marking that identifies the lane as being a turning lane.

At block 510 of the method 500, the matching module 306 may execute a matching algorithm to determine associations between the keypoints 106 and the linkages 108 based on the respective keypoint embeddings and linkage embeddings outputted at block 508. The matching module 118 depicted in FIG. 1 may be a particular implementation of the matching module 306. More specifically, at block 510, the matching module 118 may receive the keypoint embeddings 114 and the linkage embeddings 116 from the embedding learning model 112 as well as identifiers of the keypoints 106 and the linkages 108 detected by the neural network 104, and may execute a matching algorithm to determine associations between the keypoints 106 and the linkages 108 based on their corresponding embeddings. In example embodiments, the matching algorithm may be a type of linear assignment such as a Hungarian linear assignment.

For example, for a given linkage 108, the matching module 118 may determine which keypoint 106 has a corresponding keypoint embedding 114 that most closely matches a source keypoint/object embedding associated with the linkage 108. Similarly, the matching module 118 may determine which keypoint 106 has a corresponding keypoint embedding 114 that most closely matches a destination keypoint/object embedding associated with the linkage 108. In some example embodiments, each of the keypoint embeddings 114, the source object embeddings, and the destination object embeddings may be feature vectors of the feature map. In such example embodiments, determining which keypoint embedding 114 most closely matches a source/destination object embedding may include determining which of the corresponding feature vectors in the feature map have the smallest Euclidean distance there between. In other example embodiments, a different similarity measure may be used to which keypoint embedding 114 is closest to which source/destination object embedding.

In some example embodiments, the matching module 118 may select, among a set of candidate associations, a particular set of associations between keypoints 106 and linkages 108 that minimizes an aggregate loss across the set of associations. In particular, in some example embodiments, a first keypoint may be associated with a particular linkage despite a deviation/difference between a keypoint embedding of the first keypoint and a source or destination embedding of the linkage being larger than a deviation/difference between a keypoint embedding of a second keypoint and the source or destination embedding of the linkage. This may be the case because association of the first keypoint with the linkage (as opposed to association of the second keypoint with the linkage) may result in a smaller aggregate loss across all keypoint and linkage associations.

At block 512 of the method 500, the matching module 118 may output a scene graph 120. In example embodiments, the matching module 118 (or another module of the engine 210) may generate the scene graph 120 based on the associations between the keypoints 106 and the linkages 108 that were identified using the keypoint embeddings 114 and the linkage embeddings 116. In example embodiments, the scene graph 120 may include a set of nodes, where each node represents a detected keypoint 106. The scene graph 120 may further include a set of linkages/associations 108 between various keypoints 106.

At block 514 of the method 500, a localization module 124 (which may be a particular implementation of the localization module 308 depicted in FIG. 3) may determine/obtain localization information for a vehicle. In example embodiments, the localization information may include vehicle trajectory information 126 that indicates, for example, a current lane of travel for the vehicle. In example embodiments, the vehicle trajectory information 126 may further include a planned navigation route for the vehicle. For instance, as an autonomous vehicle approaches a signalized intersection, its planned trajectory may call for the vehicle to make a left turn at the intersection. In order to do so, the vehicle may need to move from a current travel lane to a left-turn-only lane. Once the autonomous vehicle moves into the left-turn-only lane, this lane may then be identified as the current lane of travel in the vehicle trajectory information 126. In some example embodiments, the vehicle system(s) may determine the vehicle's current lane based on its Global Positioning System (GPS) coordinates and map data. For instance, vehicle system(s) may determine the vehicle's location based on GPS coordinates received from an onboard GPS device and then compare that location to map data to determine the vehicle's current lane of travel. The map data may be granular enough to reveal which lane boundaries the vehicle's location falls between, and thus, which lane the vehicle is traveling in.

Control signal output module 122 (which may be a particular implementation of the control signal output module 310 depicted in FIG. 3) may then determine, based on the scene graph 120 and the vehicle trajectory information 126, a keypoint corresponding to the localization information, and in particular, to the current lane of travel of the vehicle. The control signal output module 122 may then, at block 516, output a control signal 128 indicative of an appropriate vehicle action to be taken based on a transition state of the keypoint.

More specifically, in some example embodiments, the appropriate vehicle action to be taken may be based on the transition state of the keypoint and other information such as a location of the vehicle in relation to the keypoint; data from inertial sensors of the vehicle such as vehicle acceleration, vehicle orientation, etc.; data indicative of a planned trajectory/route of the vehicle; and so forth. For example, the keypoint determined at block 516 may be a traffic signal corresponding to a current lane of travel of the vehicle. The control signal output module 122 may determine the traffic signal keypoint that corresponds to the vehicle's current lane of travel based on linkages between that keypoint and other keypoints in the scene graph 120. In particular, in the scene graph 120, keypoints corresponding to the lane boundaries of the vehicle's current lane of travel may each be connected to a given traffic signal keypoint via respective linkages. That traffic signal keypoint may then be identified as the one which corresponds to the vehicle's current travel lane. In other example embodiments, various other keypoints and their linkages to traffic signal keypoints may be used to determine the associations between traffic signal keypoints and lanes of travel. For instance, a linkage between a first keypoint representing a lane marking that indicates that a lane is a turning-only lane and a second keypoint representing a traffic signal may reveal, in conjunction with localization information that indicates the vehicle is currently in a turning-only lane, that the second keypoint is associated with the vehicle's current lane of travel.

In example embodiments, if the transition state of the traffic signal keypoint is a "green light" state, the vehicle action indicated by the control signal may be to continue traveling at a current vehicle speed. In some example embodiments, a current vehicle speed, a distance between the vehicle and the traffic signal, a traffic density, a weight of the vehicle and any occupants/cargo, or any other suitable factor may be evaluated to determine whether to maintain a current vehicle speed through the signalized intersection, increase the vehicle speed, or decrease the vehicle speed. For example, based on the current vehicle speed and the distance to the traffic signal, the control signal may instruct the vehicle to reduce its speed in order to provide more braking distance in the event that the traffic signal transitions from "green" to "yellow." In other example embodiments, if the traffic signal keypoint is in the "yellow" or "red" states, the vehicle action may be to immediately and continuously reduce the vehicle's speed until coming to a complete stop at or before the stop line at the signalized intersection. In some example embodiments, the action may be for the vehicle its current speed or even increase its speed depending on the distance between the vehicle and the traffic signal. For example, if the vehicle is traveling at a relatively high speed, and the vehicle is relatively close to the signalized intersection, it may be a safer vehicle response action for the vehicle to continue through the intersection rather than initiating a braking response. It should be appreciated that the above example vehicle response actions are merely illustrative and not exhaustive.

Figure 4:
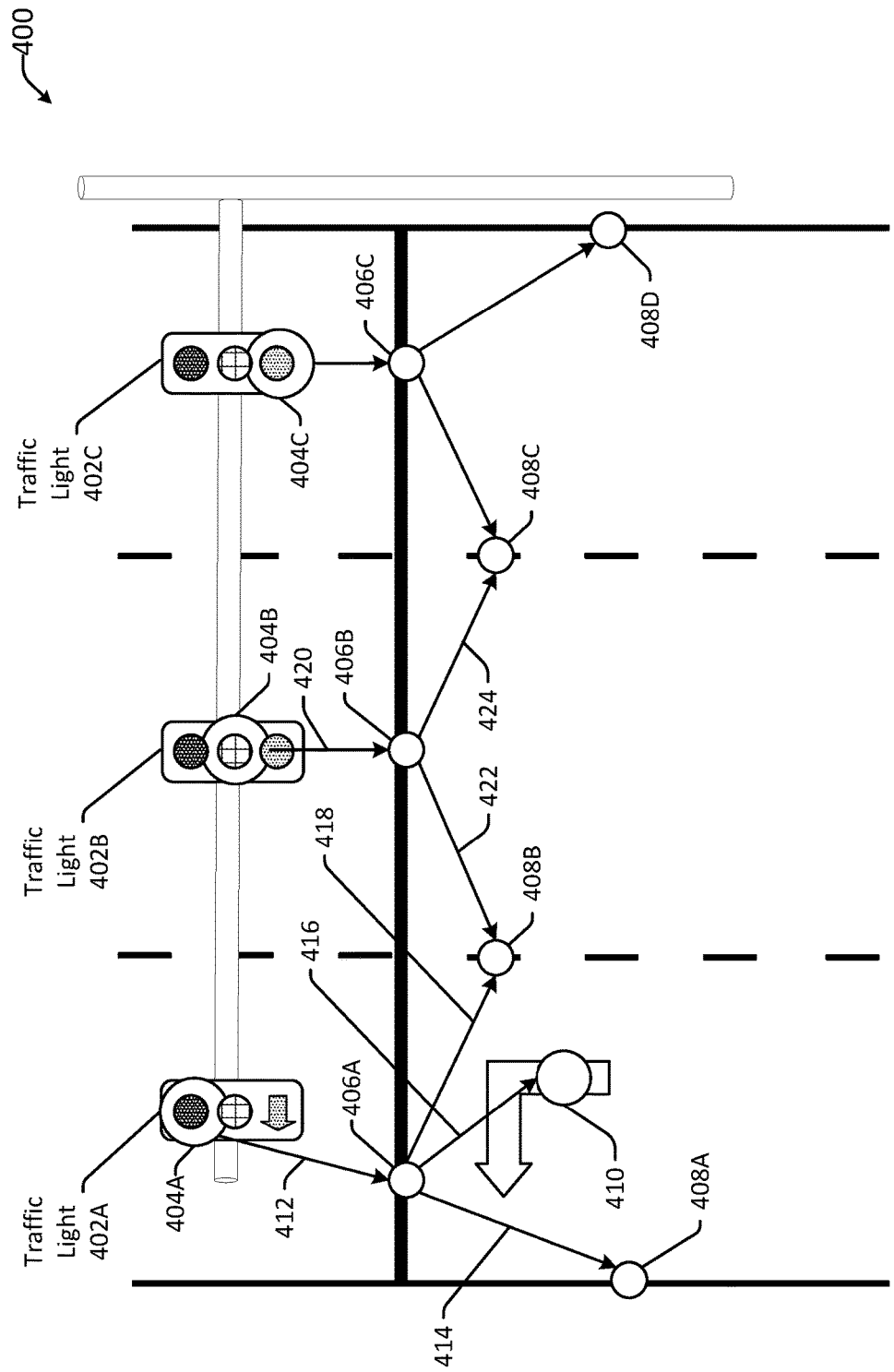
FIG. 4 depicts an example scene graph including detected keypoints and linkages between keypoints in accordance with example embodiments.

An example of the scene graph 120 is depicted in FIG. 4 as scene graph 400. The scene graph 400 may correspond to a signalized intersection. The scene graph 400 includes various nodes and various linkages between the nodes. The nodes are keypoints in the scene graph 400 that represent objects detected in a corresponding image of the signalized intersection. The linkages between the keypoints are indicative of various associations between the keypoints. The scene graph 400 includes keypoints 404A, 404B, 404C respectively corresponding to traffic signals 402A, 402B, 402C at the signalized intersection; keypoints 406A, 406B, 406C corresponding to different points along a stop line at the intersection; keypoints 408A, 408B, 408C, 408D corresponding to different lane boundaries/types of lane boundaries; and a keypoint 410 representing a particular type of lane marking (i.e., a turn lane marking).

In example embodiments, keypoints may be associated with classification types. Different keypoints representing the same type of object may nonetheless be associated with different classification types. For example, keypoints corresponding to traffic signals in different transition states (e.g., a "red light" state vs. a "green light" state) may be associated with different classification types, and may be represented in the scene graph 400 using indicia indicative of a given keypoint's classification type. For instance, the keypoint 404A may represent the traffic signal 402A in a "red light" state, while the keypoint 404A may represent traffic light 402B in a "yellow light" state, and the keypoint 404B may represent traffic light 402C in a "green light" state. The keypoints 404A, 404B, and 404C may include indicia (e.g., different colors, shading, patterns, or the like) that identify the keypoints 404A, 404B, 404C as corresponding to different classification types, in this case, transition states of respective traffic signals 402A, 402B, 402C. In example embodiments, the keypoints 406A, 406B, 406C may all have the same classification type, as there may be no meaningful distinction between the stop lines at keypoint 406A versus the stop line at the keypoint 406C. The keypoints 406A, 406B, 406C representing a stop line at the signalized intersection can be located at an intersection between the stop line and a center line of the corresponding travel lane (e.g., keypoint 406b) or at any other suitable position along the stop line (e.g., keypoints 406A, 406C). Further, in some example embodiments, among the keypoints representing lane boundaries associated with different vehicle travel lanes, the keypoints 408A, 408D may have different classification types than the keypoints 408B, 408C. In particular, the keypoints 408A, 408D may represent lane boundaries between a vehicle travel lane and a road shoulder, whereas the keypoints 408B, 408C may represent lane boundaries between adjacent travel lanes.

The scene graph 400 also includes various linkages between keypoints. For instance, the keypoint 404A may be linked to keypoint 406A via linkage 412. The linkage 412 may represent an association between the traffic signal 402A represented by the keypoint 404A and a portion of the stop line at the signalized intersection that is represented by the keypoint 406A. Moreover, keypoint 406A may be linked to keypoint 408A via linkage 414, may be linked to keypoint 410 via linkage 416, and may be linked to keypoint 408B via linkage 418. In particular, the linkages 414, 416, and 418 may represent associations between the stop line keypoint 406A and the lane boundary keypoint 408A, the stop line keypoint 406A and the lane marking keypoint 410, and the stop line keypoint 406A and the lane boundary keypoint 408B, respectively. As another, non-limiting example, consider the stop line keypoint 406B corresponding to the middle vehicle travel lane. The stop line keypoint 406B may be connected to keypoint 404B via linkage 420. In addition, the stop line keypoint 406B may be connected to keypoint 408B via linkage 422 and may be connected to keypoint 408C via linkage 424. Keypoints 404C, 406C, 408C, and 408D may similarly be connected via various linkages in the scene graph 400.

In example embodiments, a grouping of keypoints in the scene graph 400 and the various linkages there between may be used to associate particular keypoints (e.g., a particular traffic signal) with particular vehicle lanes of travel. For example, keypoints 404A, 406A, 408A, 408B, and 410 and the various linkages there between in the scene graph 400 may be used, along with vehicle localization information, to determine that the traffic signal 402A is associated with the leftmost vehicle lane depicted in FIG. 4. More specifically, vehicle localization data may be used to determine that a vehicle is currently in the leftmost vehicle lane. Keypoints 408A and 408B may be identified as representing the lane boundaries of that vehicle lane. The linkages 414 and 418 may indicate that the keypoints 408A, 408B are associated with stop line keypoint 406A, and linkage 412 may further indicate that keypoint 406A is associated with keypoint 404A, which is representative of traffic light 402A. In this manner, the traffic light 402A can be identified as being associated with the vehicle's current lane of travel (e.g., the leftmost lane). In addition, in some embodiments, the keypoint 410 may indicate the vehicle's current travel lane (e.g., a camera mounted on the vehicle may detect the lane marking represented by the keypoint 410), and the keypoint 410 and its linkage to the stop line keypoint 406A, and ultimately, to the traffic signal keypoint 404A may be used to determine the appropriate association between the traffic signal 402A and the vehicle's current travel lane.

Figure 6:
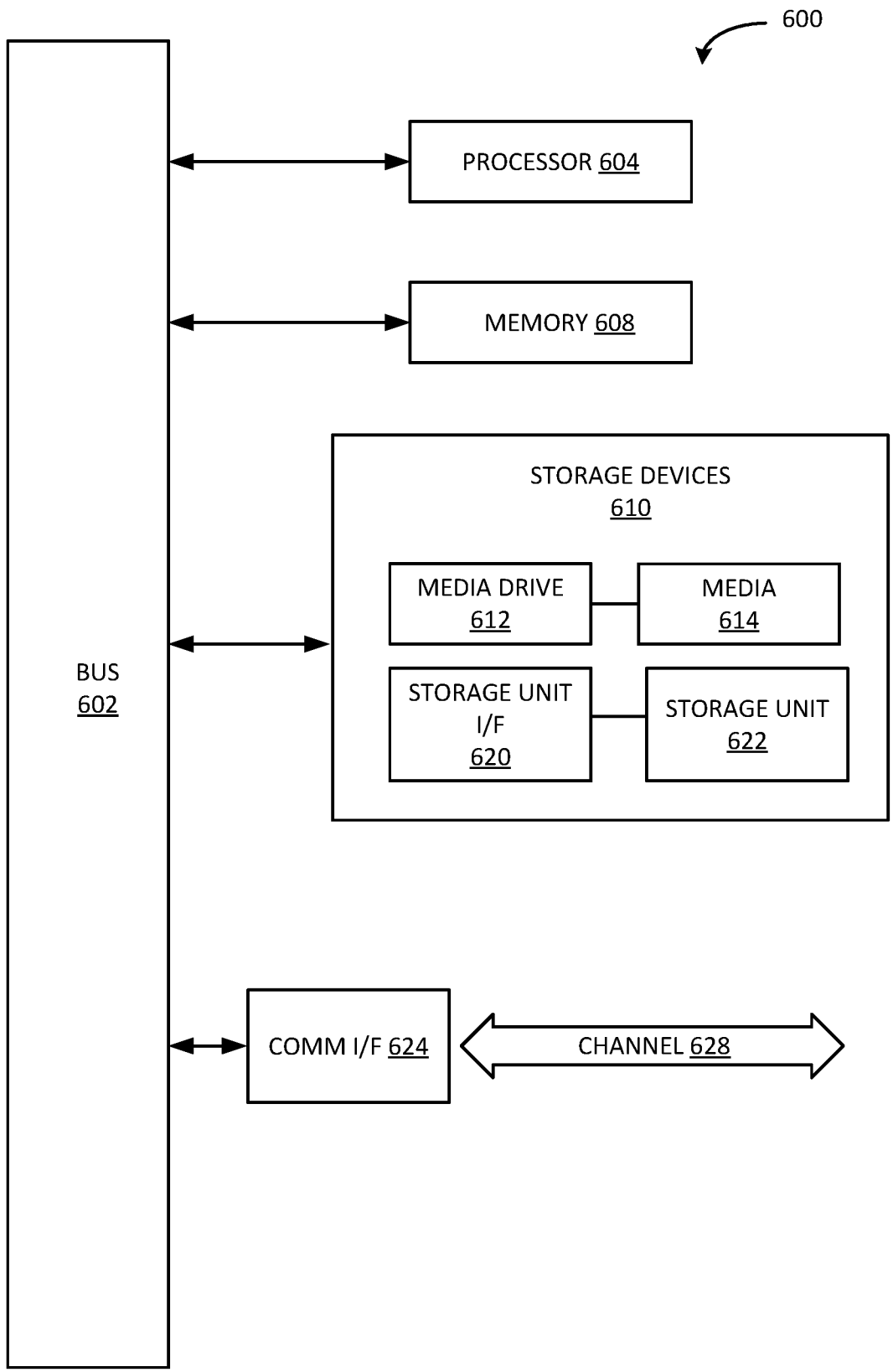
FIG. 6 is an example computing component that may be used to implement various features of embodiments of disclosed technology.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor 606, the processor 206 (FIG. 2A), or the like. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608, which may, in example embodiments, include the memory 208 (FIG. 2A). For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system, comprising:
    at least one memory storing machine-executable instructions; and
    at least one processor configured to access the at least one memory and execute the machine-executable instructions to:
        determine, using a machine learning model, an output based on an image, the output comprising a collection of keypoints in the image, a collection of linkages in the image, and a feature map associated with the image;
        determine a collection of keypoint embeddings and a collection of linkage embeddings based on the output;
        generate a scene graph of the image based on associations between the collection of keypoints and the collection of linkages, the associations being determined based on the collection of keypoint embeddings and the collection of linkage embeddings; and
        output a vehicle control signal based on the scene graph and localization information for the vehicle.

2. The system of claim 1, wherein the scene graph corresponds to a signalized intersection, wherein the collection of keypoints comprises a first keypoint, and wherein the at least one processor is further configured to execute the machine-executable instructions to:
    determine a current travel lane of the vehicle based on the localization information; and
    determine, based on the scene graph, that the first keypoint is associated with the current travel lane, wherein the first keypoint corresponds to a traffic signal in the signalized intersection, the traffic signal having an associated transition state.

3. The system of claim 2, wherein the collection of keypoints further comprises a second keypoint and a third keypoint and the collection of linkages comprises a first linkage and a second linkage, and wherein the at least one processor is configured to determine that the first keypoint is associated with the current travel lane by executing the machine-executable instructions to:
    determine, based on the scene graph, that the second keypoint corresponds to a first lane boundary of the current travel lane;
    determine, based on the scene graph, that the third keypoint corresponds to a second lane boundary of the current travel lane; and
    determine, based on the scene graph, that the first keypoint is associated with the second keypoint via the first linkage and that the first keypoint is associated with the third keypoint via the second linkage.

4. The system of claim 2, wherein the vehicle control signal is indicative of a predetermined vehicle action associated with the transition state of the traffic signal.

5. The system of claim 1, wherein each keypoint is a respective pixel location in the image that is associated with a corresponding candidate object.

6. The system of claim 5, wherein the at least one processor is configured to determine the collection of keypoint embeddings by executing the machine-executable instructions to determine, for each keypoint, a respective feature vector in the feature map that corresponds to the keypoint.

7. The system of claim 6, wherein the at least one processor is further configured to execute the machine-executable instructions to:
determine a respective classification for the corresponding candidate object associated with each keypoint; and
associate, for each keypoint, the respective classification corresponding to the keypoint with the respective feature vector corresponding to the keypoint.

8. The system of claim 1, wherein each linkage is represented as a respective pixel location in the image along a line connecting a respective source candidate object and a respective destination candidate object.

9. The system of claim 8, wherein the at least one processor is configured to determine the collection of linkage embeddings by executing the machine-executable instructions to determine, for each linkage, a respective source object embedding for the respective source candidate object and a respective destination object embedding for the respective destination candidate object.

10. The system of claim 9, wherein the at least one processor is further configured to execute the machine-executable instructions to determine a respective relationship type between the respective source object embedding and the respective destination object embedding for each linkage.

11. The system of claim 9, wherein, for a particular linkage, the respective source object embedding is a first feature vector in the feature map and the respective destination object embedding is a second feature vector in the feature map.

12. The system of claim 9, wherein the at least one processor is configured to determine the associations between the collection of keypoints and the collection of linkages by executing the machine-executable instructions to:
determine, for a particular linkage, a first keypoint embedding that is a closest match to the respective source object embedding of the particular linkage; and
determine a second keypoint embedding that is a closest match to the respective destination object embedding of the particular linkage.

13. The system of claim 1, wherein the at least one processor is configured to determine the associations between the collection of determined keypoints and the collection of determined linkages by executing the machine-executable instructions to select, among candidate sets of associations, a particular set of associations that minimizes an aggregate loss for the scene graph.

14. A method, comprising:
determining, using a machine learning algorithm and based on detected keypoints, detected linkages, and a feature map associated with an image, keypoint embeddings and linkage embeddings;
determining associations between the detected keypoints and the detected linkages based on the keypoint embeddings and the linkage embeddings;
determining an association between a particular keypoint of the detected keypoints and a current travel lane of a vehicle based on the determined associations between the keypoint embeddings and the linkage embeddings; and
controlling operation of the vehicle in response to a control signal generated based on the determined association between the particular keypoint and the current travel lane of the vehicle.

15. The method of claim 14, wherein each keypoint is a respective pixel location in the image that is associated with a corresponding candidate object, and wherein each linkage is represented as a respective pixel location in the image along a line connecting a respective source candidate object and a respective destination candidate object.

16. The method of claim 14, wherein the image is an image of a signalized intersection, the method further comprising:
generating a scene graph of the signalized intersection, the scene graph identifying the determined associations between the detected keypoints and the detected linkages corresponds to a signalized intersection;
determining the current travel lane of the vehicle based on localization information associated with the vehicle; and
using the scene graph to determine the association between the particular keypoint and the current travel lane, the particular keypoint representing a traffic signal in the signalized intersection that has an associated transition state.

17. The method of claim 16, wherein the particular keypoint is a first keypoint, the detected keypoints further comprise a second keypoint and a third keypoint, and the detected linkages comprise a first linkage and a second linkage, and wherein determining the association between the first keypoint and the current travel lane comprises:
determining, based on the scene graph, that the second keypoint corresponds to a first lane boundary of the current travel lane;
determining, based on the scene graph, that the third keypoint corresponds to a second lane boundary of the current travel lane; and
determining, based on the scene graph, that the first keypoint is associated with the second keypoint via the first linkage and that the first keypoint is associated with the third keypoint via the second linkage.

18. The method of claim 16, wherein controlling operation of the vehicle comprises controlling operation of the vehicle based on a vehicle control signal that is indicative of a predetermined vehicle action associated with the transition state of the traffic signal.

19. The method of claim 16, wherein determining the linkage embeddings comprises determining, for each linkage, a respective source object embedding and a respective destination object embedding.

20. The method of claim 19, wherein determining the associations between the detected keypoints and the detected linkages comprises:
determining, for a particular linkage, a first keypoint embedding that is a closest match to the respective source object embedding of the particular linkage; and
determining a second keypoint embedding that is a closest match to the respective destination object embedding of the particular linkage.

* * * * *